(12) United States Patent
Amagasa et al.

(10) Patent No.: US 7,895,701 B2
(45) Date of Patent: Mar. 1, 2011

(54) OPPOSITE-TYPE WIPER APPARATUS

(75) Inventors: Toshiyuki Amagasa, Gunma (JP); Takashi Kondo, Saitama (JP); Toru Namiki, Saitama (JP)

(73) Assignees: MITSUBA Corporation, Kiryu-shi (JP); Honda Motor Co., Ltd., Tokyo (JP)

( * ) Notice: Subject to any disclaimer, the term of this patent is extended or adjusted under 35 U.S.C. 154(b) by 336 days.

(21) Appl. No.: 12/268,472

(22) Filed: Nov. 11, 2008

(65) Prior Publication Data
US 2009/0119865 A1    May 14, 2009

(30) Foreign Application Priority Data
Nov. 13, 2007   (JP) ............................. 2007-294868

(51) Int. Cl.
*B60S 1/08* (2006.01)

(52) U.S. Cl. .............. 15/250.13; 15/250.12; 15/250.14; 318/53; 318/62; 318/443; 318/DIG. 2

(58) Field of Classification Search ............. 15/250.12, 15/250.13, 250.14, 250.17, 250.27; 318/443, 318/444, DIG. 2, 62, 68, 53
See application file for complete search history.

(56) References Cited

U.S. PATENT DOCUMENTS

| | | | | |
|---|---|---|---|---|
| 4,900,995 A | * | 2/1990 | Wainwright | ................. 318/443 |
| 5,568,026 A | * | 10/1996 | Welch | ......................... 318/443 |
| 6,107,766 A | * | 8/2000 | Amagasa | ..................... 318/443 |
| 6,288,509 B1 | * | 9/2001 | Amagasa | ..................... 318/443 |
| 7,256,565 B2 | * | 8/2007 | Merkel et al. | ............... 318/443 |
| 7,355,360 B2 | * | 4/2008 | Assan | ......................... 318/280 |
| 2003/0117102 A1 | * | 6/2003 | Moosmann et al. | ..... 318/DIG. 2 |
| 2005/0242762 A1 | * | 11/2005 | Assan | ......................... 318/443 |

FOREIGN PATENT DOCUMENTS

JP         11-301409         11/1999

* cited by examiner

*Primary Examiner*—Gary K Graham
(74) *Attorney, Agent, or Firm*—McCormick, Paulding & Huber LLP

(57) ABSTRACT

An opposite type wiper apparatus which can prevent interference of each wiper blade even if reference position data is lost. When at least one of reference position data memory sections is in abnormal condition, angle range calculation sections correct operation angle ranges of a DR-side and an AS-side wiper motor so as to shift an upper and a lower reversal positions of a DR-side and an AS-side wiper blade toward storage positions, and so as to make a correction value from the AS-side angle range calculation section larger than a correction value from the DR-side angle range calculation section. Therefore, even when reference position data individually memorized in reference position data memory sections are lost, the DR-side and the AS-side wiper blades can be prevented from interfering with each other.

3 Claims, 8 Drawing Sheets

OPPOSITE-TYPE WIPER APPARATUS

CROSS-REFERENCE TO RELATED APPLICATION

The present application claims priority from Japanese Patent Application JP 2007-294868 filed on Nov. 13, 2007, the content of which is hereby incorporated by reference into this application.

TECHNICAL FIELD OF THE INVENTION

The present invention relates to an opposite type wiper apparatus comprising a pair of wiper blades allocated to overlap in a center portion of a windshield.

BACKGROUND OF THE INVENTION

Conventionally, on vehicles such as automobiles, a wiper apparatus for wiping off adhesive substances such as rain, snow, and sprays from preceding vehicles from a windshield to secure visibility of a driver is provided. Among the wiper apparatuses provided to the vehicles, an opposite type wiper apparatus, in which a pair of motors rotating in forward and backward directions is opposingly allocated on a left side and a right side of the vehicle in order to comply to constriction of location spaces of the wiper apparatuses inside an engine compartment et al., is known. This opposite type wiper apparatus is, by rotating each motor in the forward and the backward directions, configured to perform a reciprocating wiping action by a pair of wiper blades which are allocated to overlap in a center portion of the windshield. Therefore, the opposite type wiper apparatus, compared to a popular wiper apparatus (tandem type wiper apparatus) which performs the reciprocating wiping action of the pair of wiper blades by a single motor via a linking mechanism, is made feasible that movable portions including the linking mechanism is made smaller, and is able to comply to the constriction of the allocation spaces.

For the opposite type wiper apparatus, for example, an art described in Patent Document 1 (Japanese Patent Application Laid-Open Publication No. 11-301409) is known. The opposite type wiper apparatus described in Patent Document 1 performs a synchronous operation of a driver-seat side (DR-side) motor and a passenger-seat side (AS-side) motor by a controller, so that a DR-side wiper blade and an AS-side wiper blade are allowed to perform reciprocating wiping actions over the windshield without interfering each other. And, the synchronous operation of each motor is performed based on pulse signals outputted according to rotation of each motor, and the controller compares true position data (measured value) of each wiper blade with reference position data (target value) of each wiper blade previously memorized in a nonvolatile memory (ROM), and controls each wiper motor rotatably so that the measured value nears the target value.

SUMMARY OF THE INVENTION

However, according to the opposite type wiper apparatus described in aforementioned Patent Document 1, if the ROM malfunctions or is reset from a short circuit etc. caused by any reason, the aforementioned target value of the relevant opposite type wiper apparatus, set by a layout pattern for each vehicle, may be lost, and in such a case, it will be impossible to precisely synchronize each motor. As a result, a wiping area of each wiper blade is misaligned, and problems such as the wiper blades interfering each other may occur.

An object of this invention is to provide an opposite type wiper apparatus which can prevent an interference of wiper blades even if the reference position data is lost.

An opposite type wiper apparatus of the present invention is an opposite type wiper apparatus having a first wiper blade on an upper side, and a second wiper blade on a lower side, the first and the second wiper blades being disposed so as to overlap in a center portion of a windshield, each of the first and the second wiper blades being moved between a lower reversal position and an upper reversal position of the windshield from a storage position by turning on an operation switch, and performing a reciprocating wiping motion between the lower reversal position and the upper reversal position, the apparatus comprising a first driving force transmission mechanism transmitting a driving force to the first wiper blade, a first motor having a first output shaft driving the first driving force transmission mechanism and a first rotation shaft rotatably driving the first output shaft, a first signal output means being provided to the first motor and outputting a motor driving signal outputted from the first motor, a first control unit being inputted an output signal from the first signal output means, and rotatably controlling the first motor based on the relevant output signal, a first reference position data memory section being provided to the first control unit, and memorizing reference position data of the first wiper blade with respect to the windshield, a first true position data calculation section being provided to the first control unit and calculating true position data of the first wiper blade with respect to the windshield wherein the true position data is obtained based on the output signal, a first operation angle range calculation section being provided to the first control unit and calculating an operation angle range of the first motor based on the true position data and the reference position data, a first abnormal condition judging section judging an abnormal condition of the first reference position memory section, a second driving force transmission mechanism transmitting the driving force to the second wiper blade, a second motor having a second output shaft driving the second driving force transmission mechanism, and a second rotating shaft rotatably driving the second output shaft, a second signal output means being provided to the second motor and outputting a motor driving signal outputted from the second motor, a second control unit being inputted an output signal from the second signal output means and rotatably controlling the second motor based on the relevant output signal, a second reference position data memory section being provided to the second control unit and memorizing reference position data of the second wiper blade with respect to the windshield, a second true position data calculation section being provided to the second control unit and calculating true position data of the second wiper blade with respect to the windshield wherein the true position data is obtained based on the output signal, a second operation angle range calculation section being provided to the second control unit and calculating an operation angle range of the second motor based on the true position data and the reference position data, a second abnormal condition judging section judging an abnormal condition of the second reference position data memory section, and a communication line being connected between the first control unit and the second control unit, and exchanges control data between the control units, wherein the first and the second operation angle range calculation sections correct the operation angle ranges of the first and the second motors so as to shift the upper and lower reversal positions toward the storage position when at least one of the first and the second abnormal condition judging sections gives an "abnormal" judgment, and so as to make a correction amount of the second operation angle range calculation section larger than a correction amount of the first operation angle range calculation section.

The opposite type wiper apparatus according to the present invention is that the first signal output means includes a first analog signal output means outputting an analog signal according to a rotation angle of the first output shaft, and a first pulse signal output means outputting a pulse signal according to a rotation state of the first rotation shaft, and that the second signal output means includes a second analog signal output means outputting an analog signal according to a rotation angle of the second output shaft, and a second pulse signal output means outputting a pulse signal according to a rotation state of the second rotation shaft.

The opposite type wiper apparatus according to the present invention is that the first and the second control units rotatably control the first and the second motors respectively so that when the operation switch is turned off after corrections of the first and the second operation angle range calculation sections, the first and the second wiper blades are stopped at their corrected lower reversal positions.

According to the present invention, when at least one of the first and second reference position data memory sections is in an abnormal condition, the first and second operation angle range calculation sections correct the operation angle ranges of the first and second motors so as to shift the upper and lower reversal positions of the first and second wiper blades toward their respective storage positions, and so as to make a correction amount of the second operation angle range calculation section larger than a correction amount of the first operation angle range calculation section. Therefore, the first and second wiper blades interfering with each other can be prevented even if the reference position data memorized in the first and second reference position data memory sections are lost. Also, because each entire wiping area of the first and second wiper blades is shifted toward the storage position, interferences of the first and second wiper blades to the windshield frame et al. on their respective upper reversal position sides can be prevented, and an abnormal condition of the apparatus can be promptly noticed to an operator.

According to the present invention, the first and second control units rotatably control the first and second motors to stop each of the first and second wiper blades at its corrected lower reversal position when the operation switch is turned off after the corrections of the first and second operation angle range calculation sections are made. Therefore, the abnormal condition of the apparatus can be promptly noticed to the operator.

BRIEF DESCRIPTIONS OF THE DRAWINGS

DESCRIPTIONS OF THE PREFERRED EMBODIMENTS

Figure 1:
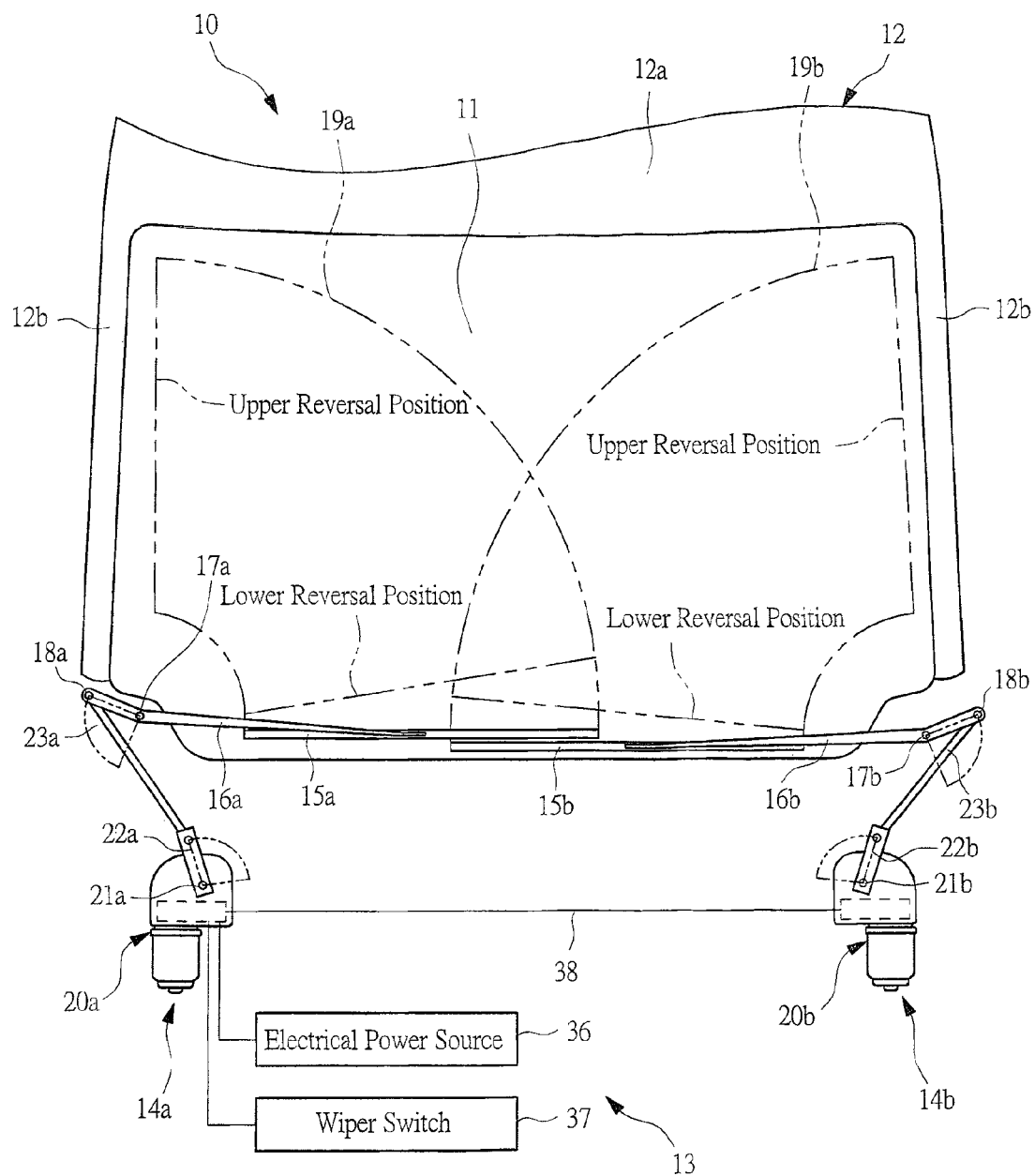
FIG. 1 is an explanatory view explaining an opposite type wiper apparatus according to the present invention.
Figure 2:
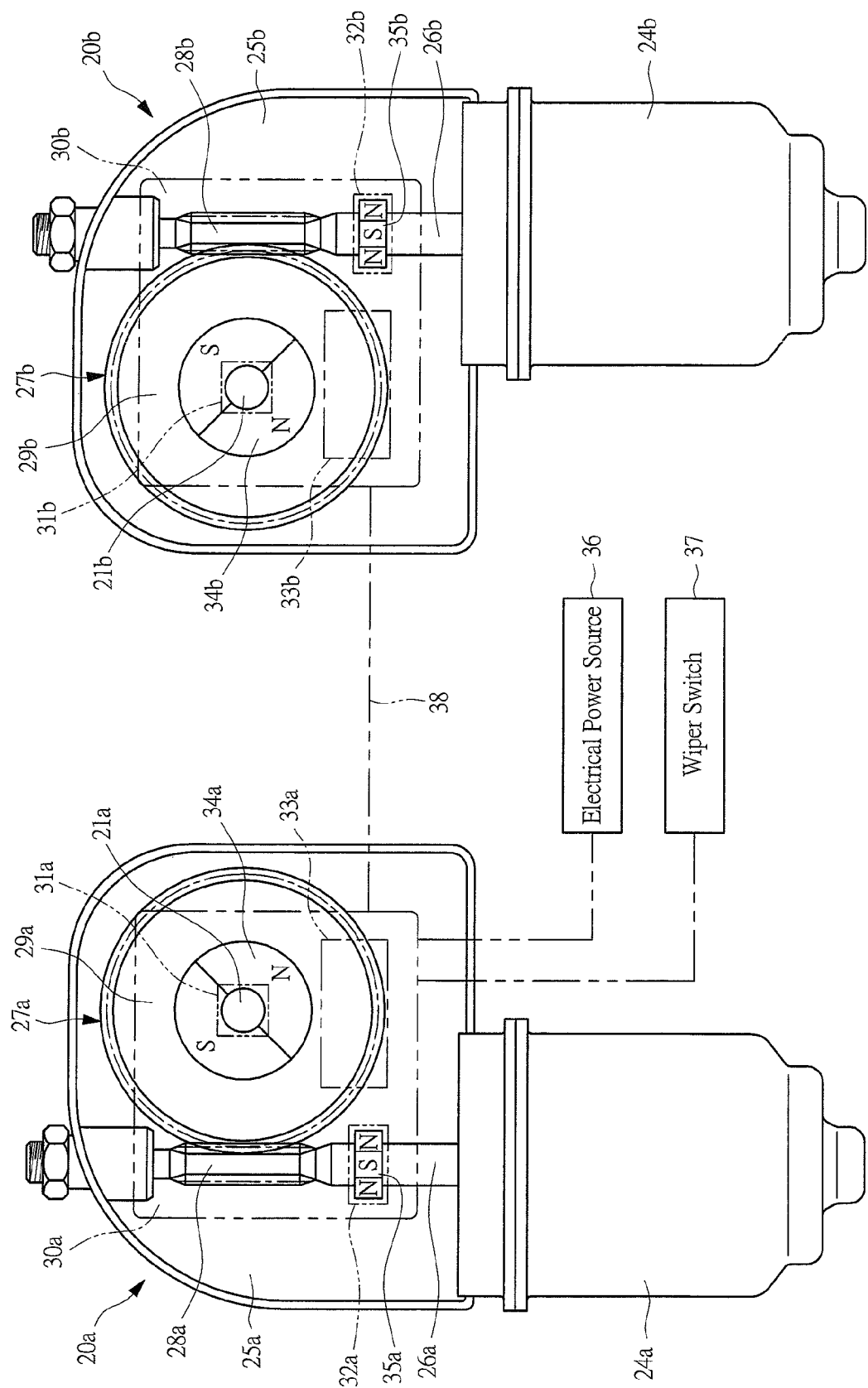
FIG. 2 is an explanatory view explaining wiper motors of the opposite type wiper apparatus of FIG. 1.
Figure 3:
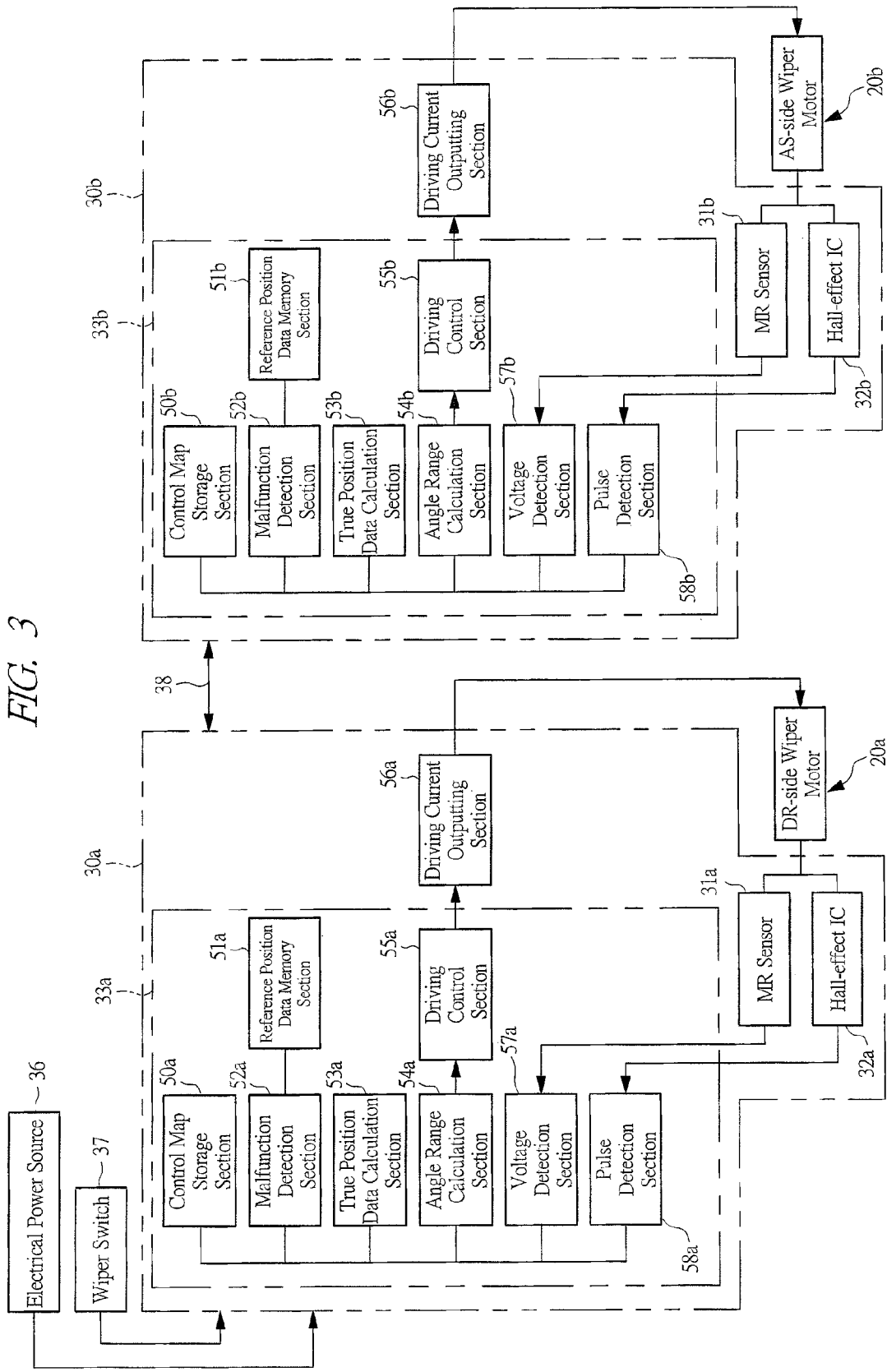
FIG. 3 is a block diagram of the opposite type wiper apparatus of FIG. 1.
Figure 4:
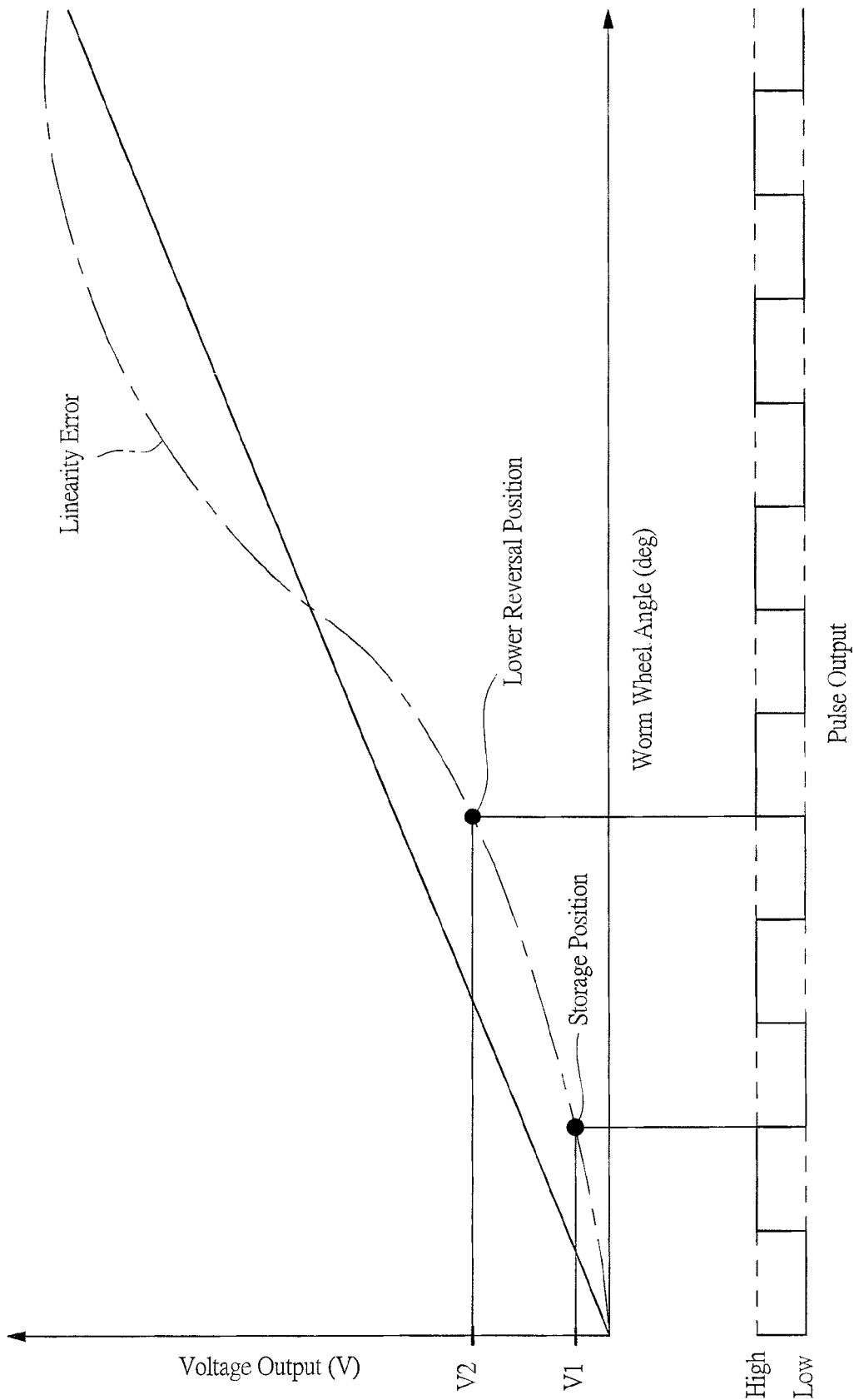
FIG. 4 is an explanatory view of explaining an output characteristic of an MR sensor.

Hereinafter, an embodiment of the opposite type wiper apparatus according to the present invention will be explained in detail with reference to the drawings. FIG. 1 is an explanatory drawing explaining an opposite type wiper apparatus according to the present invention which is equipped by a vehicle, FIG. 2 is an explanatory drawing explaining wiper motors of the opposite type wiper apparatus of FIG. 1, FIG. 3 is a block diagram of the opposite type wiper apparatus of FIG. 1, and FIG. 4 is an explanatory drawing explaining an output characteristic of an MR sensor.

As shown in FIG. 1, a front glass 11 as a windshield is mounted on a vehicle 10, and this front glass 11 is supported by a ceiling portion 12a forming a vehicle body 12 and by a pair of front pillar portions 12b allocated on a left side and a right side of the vehicle 10. In other words, the ceiling portion 12a and the front pillar portions 12b are supporting frames supporting the front glass 11.

On a lower end side of the front glass 11, an opposite type wiper apparatus 13 is equipped to wipe off adhesive substances such as rain, snow, and sprays from a preceding vehicle, adhering to the relevant front glass 11 to secure a visibility of a driver. This opposite type wiper apparatus 13 comprises a DR-side wiper apparatus 14a allocated to the driver-seat side (DR-side) of the vehicle 10, and an AS-side wiper apparatus 14b allocated to the passenger-seat side (AS-side) of the vehicle 10, and the wiper apparatuses 14a and 14b are identically constituted and allocated mutually opposingly on the left side and the right side of the vehicle 10.

The wiper apparatuses 14a and 14b have a DR-side wiper blade (first wiper blade) 15a and an AS-side wiper blade (second wiper blade) 15b, respectively, and the wiper blades 15a and 15b are individually allocated in the storage positions in a stopped condition as shown in FIG. 1. In the relevant stopped condition, the DR-side wiper blade 15a is allocated so as to overlap on an upper side of the AS-side wiper blade 15b in a center portion of the front glass 11 with a predetermined interval.

The wiper blades 15a and 15b are rotatably mounted on tip sides of a DR-side wiper arm 16a and an AS-side wiper arm 16b, and base end sides of the wiper arms 16a and 16b are rotatably mounted on a DR-side pivot shaft 17a and an AS-side pivot shaft 17b. On the base end sides of the wiper arms 16a and 16b, a DR-side driving pin 18a and an AS-side driving pin 18b are respectively provided to move the wiper arms 16a and 16b swingably, and by moving the driving pins 18a and 18b reciprocably around the pivot shafts 17a and 17b as their respective axes in forward and backward directions within predetermined angle ranges, the wiper blades 15a and 15b reciprocably perform wiping motions in a DR-side wiping area 19a and an AS-side wiping area 19b over the front glass 11.

A DR-side wiper motor (first wiper motor) 20a and an AS-side wiper motor (second wiper motor) 20b, constituting the wiper apparatuses 14a and 14b, comprise a DR-side output shaft (first output shaft) 21a and an AS-side output shaft (second output shaft) 21b, and one end sides of a DR-side link plate 22a and an AS-side link plate 22b are fixed to the relevant output shafts 21a and 21b, the link plates 22a and 22b being rotated in conjunction with rotations of the output shafts 21a and 22b.

Between the link plate 22a and the driving pin 18a, and between the link plate 22b and the driving pin 18b, a DR-side link rod 23a and an AS-side link rod 23b are provided, and both end sides of the link rods 23a and 23b are rotatably connected to the link plates 22a and 22b and the driving pins 18a and 18b. Here, a first driving force transmission mechanism and a second driving force transmission mechanism of the present invention comprise the wiper arms 16a and 16b, the link rods 23a and 23b, and the link plates 22a and 22b, respectively.

As shown in FIG. 2, the wiper motors 20a and 20b comprise a DR-side motor portion 24a and an AS-side motor portion 24b, and a DR-side gear case portion 25a and an AS-side gear case portion 25b. Inside the motor portions 24a and 24b, a DR-side shaft (first rotation shaft) 26a and an AS-side shaft (second rotation shaft) 26b are rotatably provided, and each of the shafts 26a and 26b rotates at predetermined speed according to magnitude of a driving current.

Inside the gear case portions 25a and 25b, a DR-side reduction mechanism 27a and an AS-side reduction mechanism 27b are accommodated. The reduction mechanisms 27a and 27b respectively include a DR-side worm 28a and an AS-side worm 28b which are integrally formed with the shafts 26a and 26b, and a DR-side worm wheel 29a and an AS-side worm wheel 29b with the output shafts 21a and 21b fixed in their center axes. The worm wheels 29a and 29b are rotatably provided in the gear case portions 25a and 25b, and the worm wheels 29a and 29b are meshed with the worms 28a and 28b enabling them to mutually transmit the driving force. Thereby, rotation of each of the shafts 26a and 26b is reduced to a predetermined speed, and the rotation, in which torque is enhanced, are made possible to be outputted to an outside via the output shafts 21a and 21b.

Inside the gear case portions 25a and 25b, a DR-side control board 30a and an AS-side control board 30b are provided as shown in double dotted lines in FIG. 2, and on the control boards 30a and 30b, a DR-side MR sensor (first signal output means, first analog signal output means) 31a and an AS-side MR sensor (second signal output means, second analog signal output means) 31b, which output analog signals (motor driving signal) according to rotation angles of the output shafts 21a and 21b, are provided, respectively. Also on the control boards 30a and 30b, a DR-side Hall-effect IC (first signal output means, first pulse signal output means) 32a and an AS-side Hall-effect IC (second signal output means, second pulse signal output means) 32b, which output pulse signals (motor driving signal) according to rotation states of the shafts 26a and 26b, are respectively provided. Further on the control boards 30a and 30b, a DR-side control unit (first control unit) 33a and an AS-side control unit (second control unit) 33b are provided, and the control units 33a and 33b receive output signals from the MR sensors 31a and 31b, and the Hall-effect ICs 32a and 32b, and rotatably control the wiper motors 20a and 20b, respectively.

Here, the MR sensors 31a and 31b output voltage signals continuously according to relative rotations of a DR-side ring magnet 34a and an AS-side ring magnet 34b, which are fixed to the worm wheels 29a and 29b. Also, the Hall-effect ICs 32a and 32b output square-wave signals of HIGH or LOW value according to relative rotations of a DR-side multipolar magnet 35a and an AS-side multipolar magnet 35b, which are fixed to the shafts 26a and 26b.

As shown in FIG. 2, to the DR-side control board 30a, an electrical power source 36 such as an onboard battery is electrically connected, and a wiper switch (operation switch) 37 provided inside the cabin et al. (not shown) is connected electrically. The DR-side control board 30a and the AS-side control board 30b are electrically connected by a communication line 38, and this communication line 38 exchanges control data between the DR-side control unit 33a and the AS-side control unit 33b, and in addition to the relevant control data exchange, the communication line 38 electrically connects the electrical power source 36 and the AS-side control board 30b via the DR-side control board 30a.

The control units 33a and 33b, provided to the control boards 30a and 30b, are configured as shown in FIG. 3. In a DR-side control map storage section 50a and an AS-side control map storage section 50b, an angle difference of the wiper blades 15a and 15b (see FIG. 1), target velocities of the wiper blades 15a and 15b at any given position on the front glass 11, and duty values for pulse width modulation (PWM) driving of the wiper blades 15a and 15b according to loads imposed on them, et al., are stored.

A DR-side reference position data memory section (first reference position data memory section) 51a and an AS-side reference position data memory section (second reference position data memory section) 51b are constituted by non-volatile memory units such as EEPROMs. In order to suppress variations caused by individual differences of the MR sensors 31a and 31b, reference position data (reference angle) of the wiper motors 20a and 20b, which are obtained from relationships between voltage signals of MR sensors 31a and 31b and square-wave signals of Hall-effect ICs 32a and 32b, is stored in the reference position data memory sections 51a and 51b. The reference position data stored (memorized) in the reference position data memory sections 51a and 51b are set by taking in account layout states of the wiper apparatuses 14a and 14b with respect to the vehicle 10, and the storage position and the lower reversal position in a condition that the wiper apparatuses 14a and 14b is equipped to the vehicle 10 is stored as the reference position data as shown in FIG. 1.

The MR sensors 31a and 31b each possesses a characteristic as shown in FIG. 4. In other words, a linearity error shown in a dash-single dot line in Figure exists in each of the MR sensors 31a and 31b (with respect to a theoretical value as shown in a solid line in Figure). In order to absorb this linearity error and obtain the correct reference position data, first, the wiper blades 15a and 15b are positioned at the storage positions as shown in FIG. 1, and a voltage signal V1 of each of the MR sensors 31a and 31b at this position is memorized. Then, the wiper motors 20a and 20b are either automatically or manually actuated, and while the square wave signal (pulse signal) from each of the Hall-effect ICs 32a and 32b is counted, the wiper blades 15a and 15b are moved to the lower reversal positions. At this time, accuracy of the lower reversal positions of the wiper blades 15a and 15b is warranted by the counted number (cumulative number) of the pulse signals.

Then, a voltage signal V2 of each of the MR sensors 31a and 31b while each of the wiper blades 15a and 15b is at the lower reversal position is memorized. In other words, relationships between voltage signals V1, V2 and the counted numbers of the pulse signals are stored in the reference position data memory sections 51a and 51b prior to use of the wiper motors 20a and 20b, and the wiper motors 20a and 20b are controlled based on this reference position data. Thereby, reflecting the accurate reference position data to the control of the wiper motors 20a and 20b is possible while the deviations of the MR sensors 31a and 31b, which output analog signals, are suppressed, and precise control of the wiper motors 20a and 20b becomes possible.

A DR-side malfunction detecting section (first abnormal condition judging section) 52a and an AS-side malfunction detecting section (second abnormal condition judging section) 52b detect abnormal conditions (malfunctions) of the reference position data memory sections 51a and 51b in a predetermined cycle. In other words, the malfunction detecting sections 52a and 52b judge validity of the reference position data stored in the reference position data memory sections 51a and 51b.

A DR-side true position data calculation section (first true position data calculation section) 53a and an AS-side true position data calculation section (second true position data calculation section) 53b calculate real positions of the wiper blades 15a and 15b with respect to the front glass 11 by performing predefined computation based on the output signals from the MR sensors 31a and 31b and the Hall-effect ICs 32a and 32b. Here, the real positions of the wiper blades 15a and 15b are respectively calculated by cumulative values of the pulse signals from the Hall-effect ICs 32a and 32b using the reference position data stored in the reference position data memory sections 51a and 51b as a reference position.

A DR-side angle range calculation section (first operation angle range calculation section) 54a and an AS-side angle range calculation section (second operation angle range calculation section) 54b calculate the operation angle ranges of the wiper motors 20a and 20b following a judgment result of the malfunction detecting sections 52a and 52b. When the malfunction detecting sections 52a and 52b judge the condition normal, the angle range calculation sections 54a and 54b set the operation angle ranges of the wiper motors 20a and 20b to wipe the wiping areas 19a and 19b as shown in FIG. 1. On the other hand, when either one of the malfunction judging sections 52a and 52b judges the condition abnormal, the angle range calculation sections 54a and 54b correct the operation angle ranges of the wiper motors 20a and 20b to offset the wiping areas of the wiper blades 15a and 15b by predetermined angles toward the storage positions, as later shown in FIG. 6 and FIG. 7.

A DR-side driving control section 55a and an AS-side driving control section 55b receive control signals from the angle range calculation sections 54a and 54b, and refer to control maps in the control map storage sections 50a and 50b to select optimum duty values. Here, each of the driving control sections 55a and 55b performs sending and receiving of control data (especially the position data of the wiper blades 15a and 15b) via the communication line 38, and selects optimum duty values by taking in account the control data of the counterpart driving control section.

Then, control signals obtained from the driving control sections 55a and 55b are outputted to a DR-side driving current outputting section 56a and an AS-side driving current outputting section 56b in the next step, and the driving current outputting sections 56a and 56b output the driving currents (supplied currents) from the electrical power source 36 to the wiper motors 20a and 20b based on the control signals obtained from the driving control sections 55a and 55b.

A DR-side voltage detection section 57a and an AS-side voltage detection section 57b are connected electrically to the MR sensors 31a and 31b, and receive voltage signals from the MR sensors 31a and 31b, and a DR-side pulse detection section 58a and an AS-side pulse detection section 58b are connected electrically to the Hall-effect ICs 32a and 32b, and receive pulse signals from the Hall-effect ICs 32a and 32b.

Figure 5:
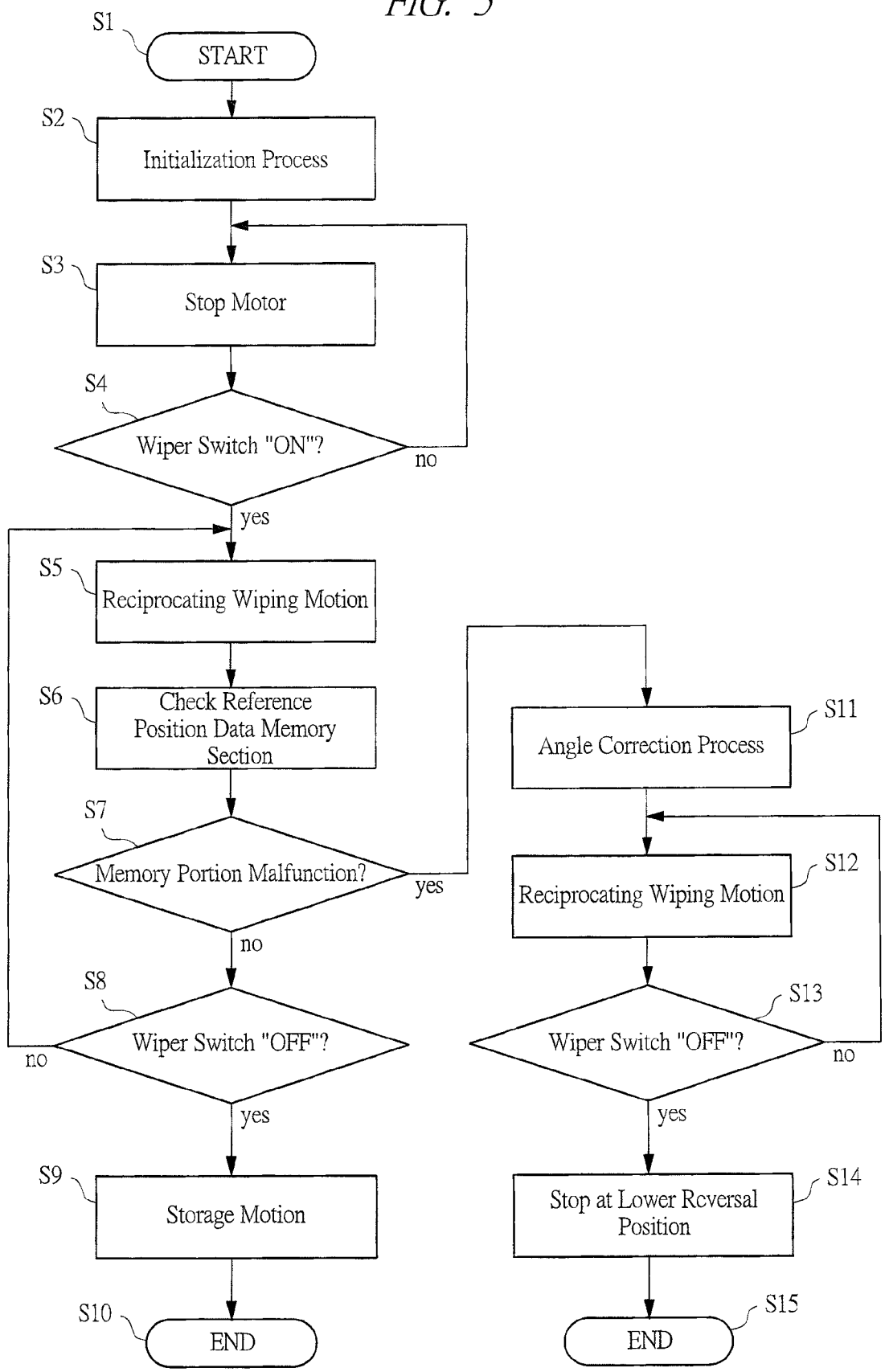
FIG. 5 is a flow chart showing an operation of the opposite type wiper apparatus of FIG. 1.
Figure 6:
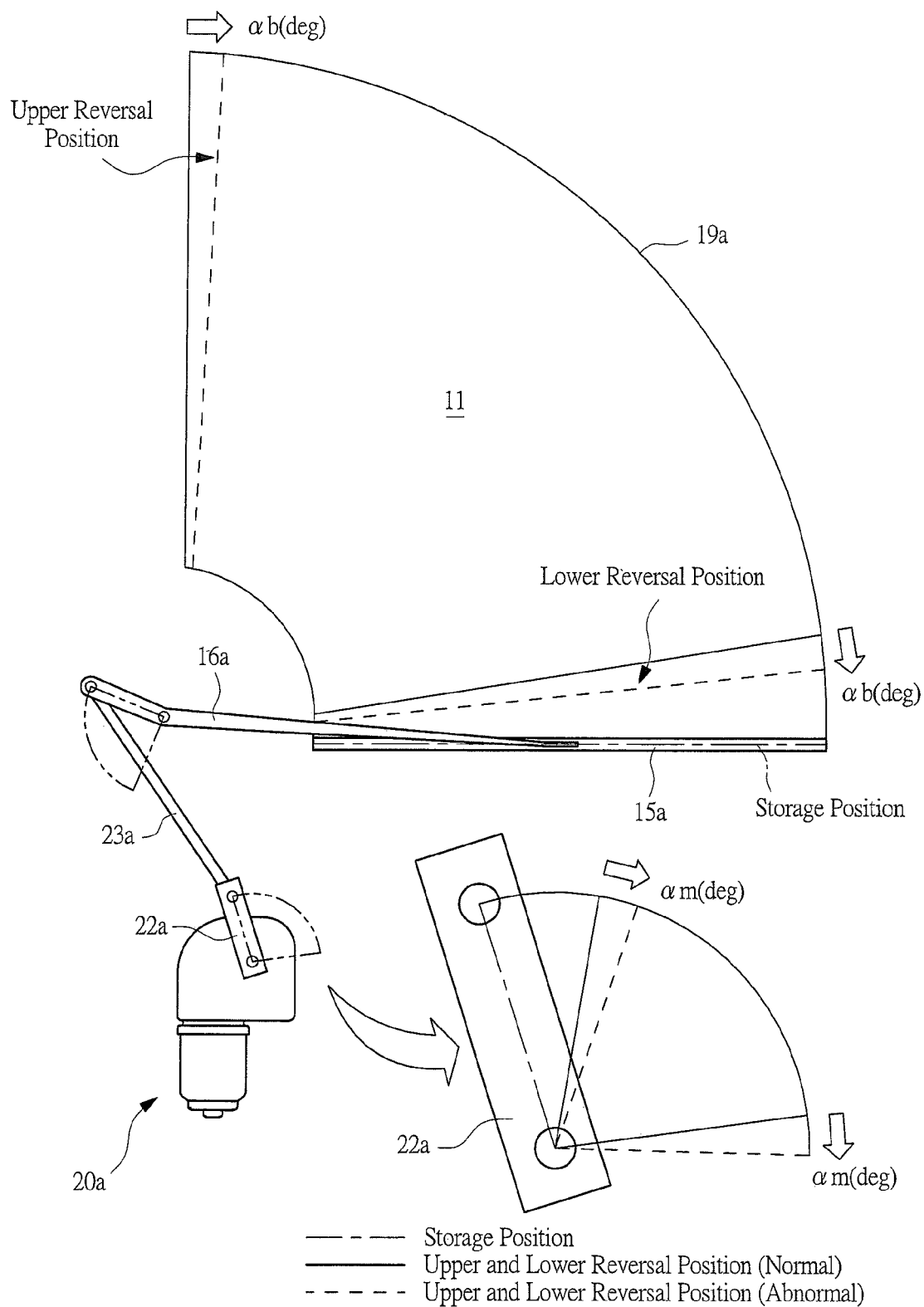
FIG. 6 is an explanatory view explaining a correction of an operation angle range of a DR-side wiper unit.
Figure 7:
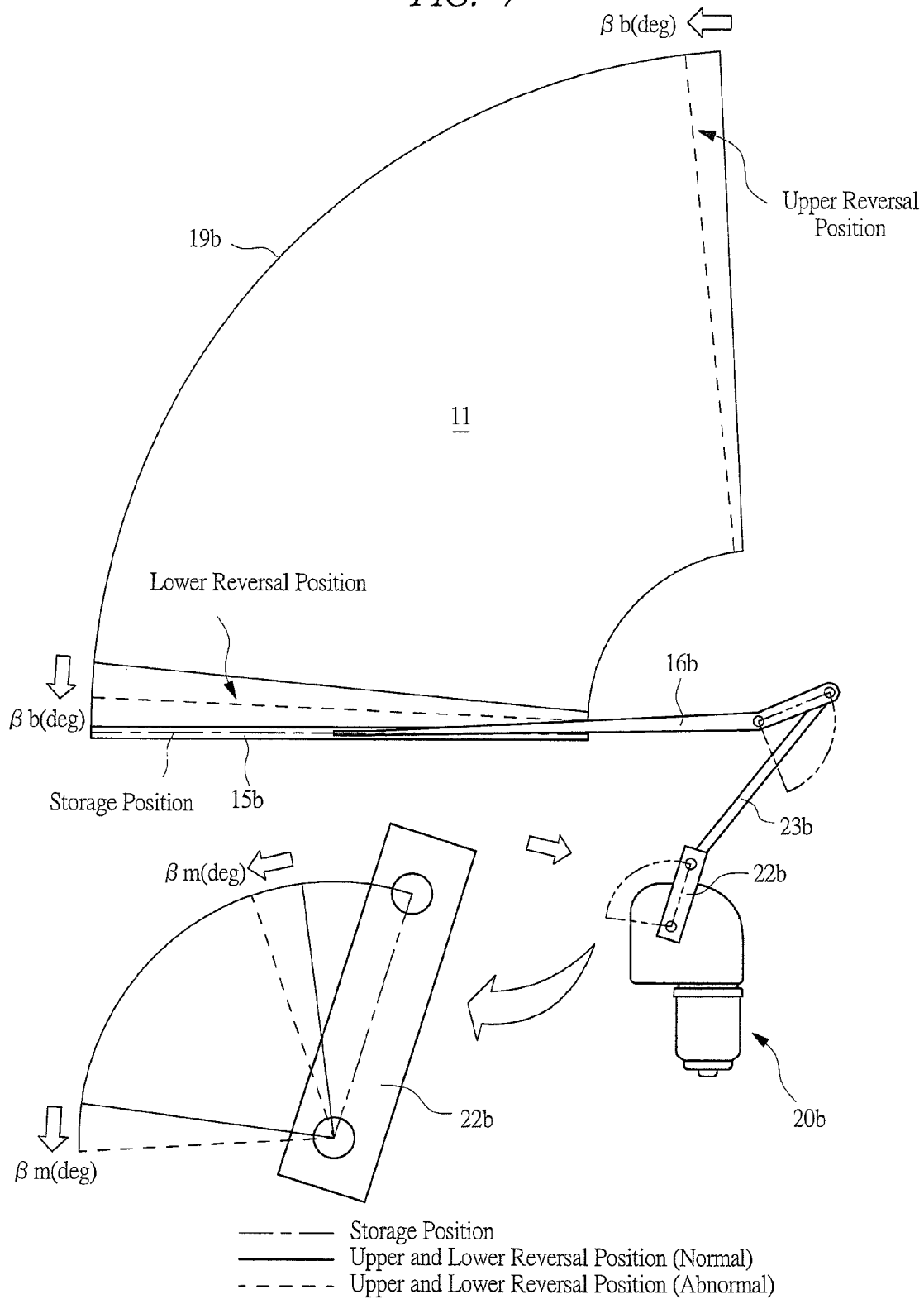
FIG. 7 is an explanatory view explaining a correction of an operation angle range of an AS-side wiper apparatus.
Figure 8:
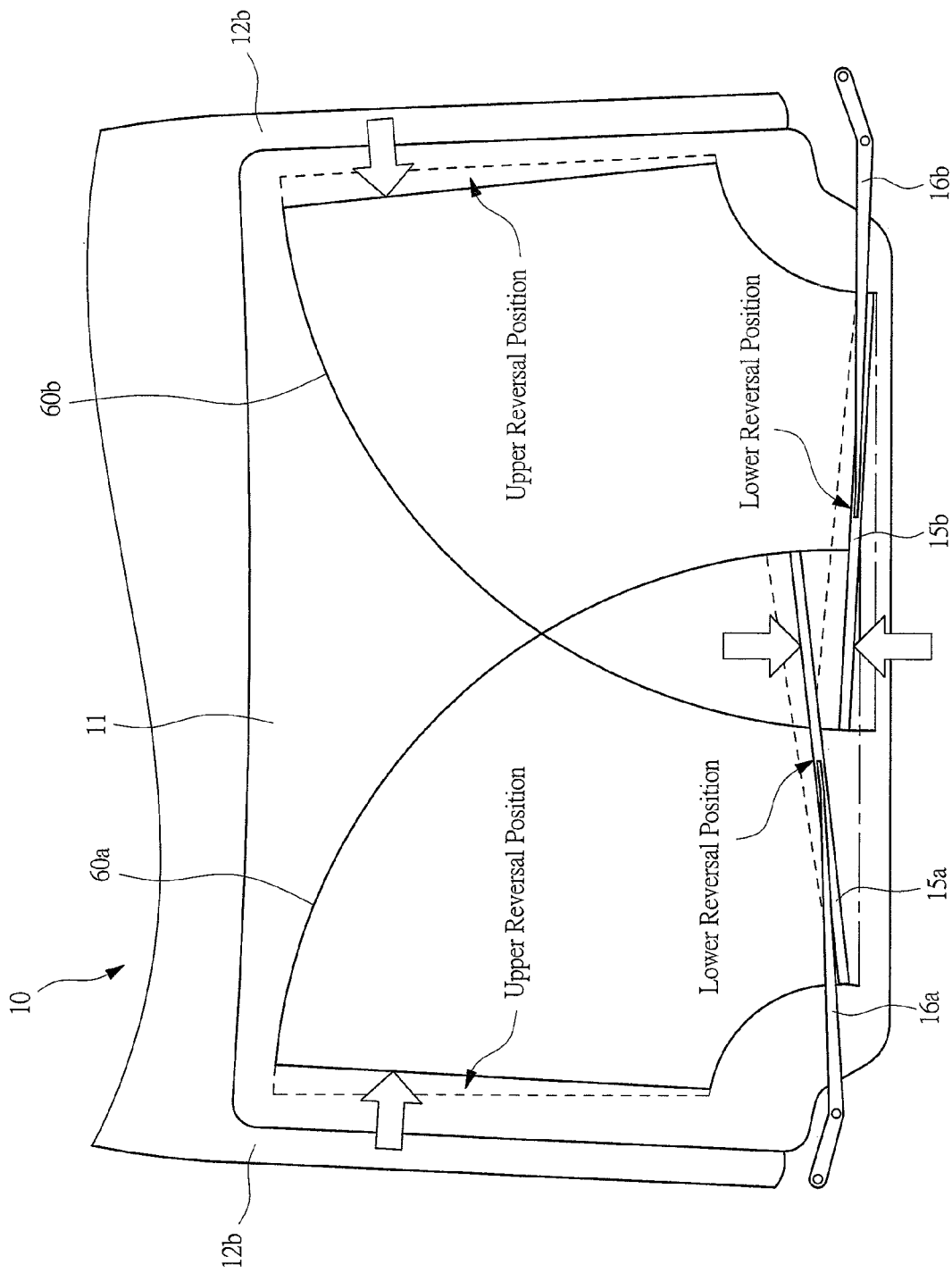
FIG. 8 is an explanatory view explaining a corrected wiping range of the opposite type wiper apparatus of FIG. 1.

Next, an explanation will be made on actuation of the opposite type wiper apparatus 13 with an aforementioned constitution based on FIG. 5 through FIG. 8. FIG. 5 is a flow chart showing the actuation of the opposite type wiper apparatus of FIG. 1, FIG. 6 is an explanatory view explaining the correction of the operation angle range of the DR-side wiper apparatus, FIG. 7 is an explanatory view explaining the correction of the operation angle range of the AS-side wiper apparatus, and FIG. 8 is an explanatory view explaining the wiping area of the opposite type wiper apparatus of FIG. 1 after the correction.

As shown in FIG. 5, when a system power source is turned on by turning on an ignition switch (not shown) (Step S1), an initialization process of the opposite type wiper apparatus 13, i.e., resetting of the pulse signal counts etc., is executed (Step S2). Next, a stopping process of the wiper motors 20a and 20b is executed at Step S3, proceeding to Step S4. At Step S4, a judgment is made on whether the wiper switch 37 is turned on by an operator or not, and if the judgment is "no", a process returning to Step S3 is repeated until an "yes" judgment is made.

When the wiper switch is turned on and the judgment "yes" is made, a reciprocating wiping motion is initiated at a next Step S5. At Step S5, first, the wiper motors 20a and 20b are rotatably controlled to their respective directions, moving each of the wiper blades 15a and 15b from the storage position to between the lower reversal position and the upper reversal position of the front glass 11, and then, the wiper blades 15a and 15b make reciprocating wiping motions in the wiping areas 19a and 19b. Meanwhile, reversal motions of the wiper motors 20a and 20b at the upper and lower reversal positions are executed upon the pulse signal counts (cumulative value) reaching a predetermined threshold.

In a following Step S6, a detection process to detect abnormalities of the reference position data memory sections 51a and 51b is executed by the malfunction detection sections 52a and 52b. In a following Step S7, a judgment is made by the malfunction detection sections 52a and 52b on whether there is an abnormality in the reference position data or not. If a judgment "no" is made at Step S7, i.e., the reference position data memory sections 51a and 51b are all in normal status and the reference position data is judged to have no abnormality, the process will proceed to Step S8. At Step S8, a judgment is made on whether the "on" operation of the wiper switch 37 by the operator is sustained or not, and when the wiper switch 37 is in the "on" state (judgment "no"), the process will return to Step S5 which is an upstream process, and reciprocating wiping motion by the wiper blades 15a and 15b in the wiping area 19a and 19b is sustained.

At Step S8, when the wiper switch 37 is judged to have been turned off by the operator (judgment "yes"), the process will proceed to Step S9, at which the wiper motors 20a and 20b are rotatably controlled to execute storage operations to move each of the wiper blades 15a and 15b to its storage position. Then, each of the wiper blades 15a and 15b is stopped at the storage position, and the reciprocating wiping motion by the wiper blades 15a and 15b in the wiping areas 19a and 19b is concluded (Step S10).

At Step S7, if the judgment is "yes", i.e., in the case that the malfunction detection sections 52a and 52b judge that at least one of the reference position data memory sections 51a and 51b is in an abnormal condition, the process will proceed to Step S11. Here, the malfunction detection sections 52a and 52b monitor the judgment result of each other via the communication line 38, which makes possible for the malfunction detection sections 52a and 52b to judge that at least one of the reference position data memory sections 51a and 51b is in an abnormal condition.

At Step S11, angle correction processes of the wiper motors 20a and 20b by the angle range calculation sections 54a and 54b are executed. At Step S11, as shown in blank arrows in FIG. 6 and FIG. 7, a correction process to shift the operation angle range of each of the wiper motors 20a and 20b correspondingly by αm (deg) and βm (deg) is executed in order to shift the upper and the lower reversal position of each wiper blades 15a and 15b by αb (deg) and βb (deg).

Here, the correction values of the wiper motors 20a and 20b, and those of the wiper blades 15a and 15b, are not identical. This is due to length dimensions and operating positions of the wiper arms 16a and 16b, link rods 23a and 23b, and link plates 22a and 22b, and varies according to a layout condition of the opposite type wiper apparatus 13 with respect to the vehicle 10. In other words, the correction values of the wiper motors 20a and 20b are individually set for each vehicle which equips the opposite type wiper apparatus 13. Also, the correction value βm of the wiper motor 20b by the AS-side angle range calculation section 54b is set larger than the correction value αm of the wiper motor 20a by the DR-side angle range calculation section 54a (βm>αm), whereby an angle difference of the wiper blades 15a and 15b at their lower reversal positions are sufficiently secured (refer to blank arrow in FIG. 8), avoiding an interference between the wiper blades 15a and 15b.

At Step S12, the wiper blades 15a and 15b are operated in the reciprocating wiping motion, as in Step S5, in wiping areas after the correction is made as decided at Step S11 (shown in dashed lines in FIG. 6 and FIG. 7). Here, the reciprocating wiping motions by the wiper blades 15a and 15b at Step S12 are as shown in FIG. 8. As shown in solid lines in FIG. 8, a DR-side wiping area and an AS-side wiping area will be as shown by notes 60a and 60b respectively, and the upper reversal positions of the wiper blades 15a and 15b are respectively offset toward a center portion (toward the storage positions) of the front glass 11 (see blank arrow in the drawing).

In a following Step S13, judgment is made on whether the "on" operation of the wiper switch 37 by the operator is sustained or not, and if the wiper switch 37 is still in the "on" condition (judgment "no"), the process returns to Step S12 which is the upstream process, and sustains the reciprocating wiping motion of the wiper blades 15a and 15b in the respective wiping areas 60a and 60b.

At Step S13, if a judgment is made that the wiper switch 37 is turned off by the operator (judgment "yes"), the process proceeds to Step S14, at which a stopping process at the lower reversal positions of the wiper motors 20a and 20b is executed in order to stop the wiper blades 15a and 15b at their lower reversal positions (lower reversal positions after the correction). Then, each of the wiper blades 15a and 15b is stopped at the lower reversal position, and the reciprocating wiping motions of the wiper blades 15a and 15b in the respective wiping areas 60a and 60b are concluded (Step S15).

As described above in detail, according to the opposite type wiper apparatus 13 according to the embodiment as shown, when at least one of the reference position data memory sections 51a and 51b is in the abnormal condition, the angle range calculation sections 54a and 54b correct the operation angle ranges of the wiper motors 20a and 20b so as to shift the upper and the lower reversal positions of the wiper blades 15a and 15b toward the storage positions, and so as to make the correction value βm by the AS-side angle range calculation section 54b larger than the correction value αm by the DR-side angle range calculation section 54a. Therefore, the wiper blades 15a and 15b can be prevented from interfering with each other even if the reference position data memorized in the reference position data memory sections 51a and 51b are lost. Also, because the entire wiping areas of the wiper blades 15a and 15b are shifted toward the storage positions, the wiper blades 15a and 15b interfering with the front pillar portions 12b on the upper reversal position side can be prevented, and the abnormal state of the opposite type wiper apparatus 13 can be promptly notified to the operator.

Additionally, according to the opposite type wiper apparatus 13 according to the embodiment shown, because the wiper motors 20a and 20b are rotatably controlled to stop the wiper blades 15a and 15b at the corrected lower reversal positions when the wiper switch 37 is turned off after the correction of the angle range calculation sections 54a and 54b, the abnormal state of the opposite type wiper apparatus 13 can be promptly notified to the operator even after the wiper motors 20a and 20b are stopped.

The present invention is not limited to the embodiment shown above, and needless to say a number of changes can be made without departing from the scope of the invention. For example, in the embodiment shown above, the control units 33a and 33b are shown to stop the wiper blades 15a and 15b at the corrected lower reversal positions in the case that the wiper switch 37 is turned off after the correction by the angle range calculation sections 54a and 54b, but the present invention is not limited as such, and the wiper blades 15a and 15b can be made to stop at the storage positions.

Also in the embodiment shown above, the opposite type wiper apparatus 13 is shown to be applied to wiping the front glass 11 of the vehicle 10, but the present invention is not limited as such, and can be applied to an opposite type wiper apparatus wiping a rear glass as the windshield.

What is claimed is:

1. An opposite type wiper apparatus having a first wiper blade on an upper side, and a second wiper blade on a lower side, the first and the second wiper blades being disposed so as to overlap in a center portion of a windshield, each of the first and second wiper blades being moved between a lower reversal position and an upper reversal position of the windshield from a storage position by turning on an operation switch, and performing a reciprocating wiping motion between the lower reversal position and the upper reversal position, the apparatus comprising:

a first driving force transmission mechanism transmitting a driving force to the first wiper blade;

a first motor having a first output shaft which drives the first driving force transmission mechanism, and a first rotation shaft rotatably driving the first output shaft;

a first signal output means being provided to the first motor, and outputting a motor driving signal sent from the first motor;

a first control unit being inputted an output signal from the first signal output means, and rotatably controlling the first motor based on the output signal;

a first reference position data memory section being provided to the first control unit, and memorizing reference position data of the first wiper blade with respect to the windshield;

a first true position data calculation section being provided to the first control unit, and calculating true position data of the first wiper blade with respect to the windshield, the true position data being obtained based on the output signal;

a first operation angle range calculation section being provided to the first control unit, and calculating an operation angle range of the first motor based on the true position data and the reference position data;

a first abnormal condition judging section judging an abnormal condition of the first reference position memory section;

a second driving force transmission mechanism transmitting a driving force to the second wiper blade;

a second motor having a second output shaft driving the second driving force transmission mechanism, and a second rotating shaft rotatably driving the second output shaft;

a second signal output means being provided to the second motor, and outputting a motor driving signal sent from the second motor;

a second control unit being inputted an output signal from the second signal output means, and rotatably controlling the second motor based on the output signal;

a second reference position data memory section being provided to the second control unit, and memorizing a reference position data of the second wiper blade with respect to the windshield;

a second true position data calculation section being provided to the second control unit, and calculating a true position data of the second wiper blade with respect to the windshield, the true position data being obtained based on the output signal;

a second operation angle range calculation section being provided to the second control unit, and calculating an operation angle range of the second motor, based on the true position data and the reference position data;

a second abnormal condition judging section judging an abnormal condition of the second reference position data memory section; and a communication line being connected between the first control unit and the second control unit, and exchanges control data between the respective control units, wherein the first and the second operation angle range calculation sections correct the operation angle ranges of the first and the second motors so as to shift the upper and lower reversal positions toward the storage position, when at least one of the first and the second abnormal condition judging sections gives an "abnormal" judgment, and so as to make a correction amount of the second operation angle range calculation section larger than a correction amount of the first operation angle range calculation section.

2. The opposite type wiper apparatus according to claim 1, wherein the first signal output means includes a first analog signal output means, which outputs an analog signal according to a rotation angle of the first output shaft, and a first pulse signal output means, which outputs a pulse signal according to a rotation state of the first rotation shaft, and the second signal output means includes a second analog signal output means, which outputs an analog signal according to a rotation angle of the second output shaft, and a second pulse signal output means, which outputs a pulse signal according to a rotation state of the second rotation shaft.

3. The opposite type wiper apparatus according to claim 1, wherein the first and the second control units rotatably control the first and the second motors respectively so that when the operation switch is turned off after corrections of the first and the second operation angle range calculation sections, the first and the second wiper blades are stopped at their corrected lower reversal positions.

* * * * *